US007035803B1

(12) United States Patent
Ostermann et al.

(10) Patent No.: US 7,035,803 B1
(45) Date of Patent: Apr. 25, 2006

(54) METHOD FOR SENDING MULTI-MEDIA MESSAGES USING CUSTOMIZABLE BACKGROUND IMAGES

(75) Inventors: Joern Ostermann, Morganville, NJ (US); Barbara Buda, Morristown, NJ (US); Mehmet Reha Civanlar, Middletown, NJ (US); Eric Cosatto, Highlands, NJ (US); Hans Peter Graf, Lincroft, NJ (US); Thomas M. Isaacson, Dunkirk, MD (US); Yann Andre LeCun, Lincroft, NJ (US)

(73) Assignee: AT&T Corp., New York, NY (US)

( * ) Notice: Subject to any disclaimer, the term of this patent is extended or adjusted under 35 U.S.C. 154(b) by 585 days.

(21) Appl. No.: 10/003,093

(22) Filed: Nov. 2, 2001

Related U.S. Application Data

(60) Provisional application No. 60/245,521, filed on Nov. 3, 2000.

(51) Int. Cl.
*G10L 13/00* (2006.01)

(52) U.S. Cl. .................. 704/260; 704/267; 704/258

(58) Field of Classification Search ............... 704/260; 345/758
See application file for complete search history.

(56) References Cited

U.S. PATENT DOCUMENTS

| | | | |
|---|---|---|---|
| 4,276,570 A | | 6/1981 | Burson et al. |
| 5,387,178 A | * | 2/1995 | Moses .......................... 600/27 |
| 5,420,801 A | * | 5/1995 | Dockter et al. ............. 345/501 |
| 5,537,662 A | | 7/1996 | Sato et al. |
| 5,546,500 A | | 8/1996 | Lyberg |
| 5,555,343 A | | 9/1996 | Luther |

(Continued)

OTHER PUBLICATIONS

W. Keith Edwards, The Design and Implementation of the MONTAGE Multimedia Mail System,Apr. 1991, IEEE Conference Proceedings of TRICOMM '91, pp. 47-57.*

(Continued)

*Primary Examiner*—W. R. Young
*Assistant Examiner*—Minerva Rivero

(57) ABSTRACT

A system and method of providing sender customization of multi-media messages through the use of inserted images or video. The images or video may be sender-created or predefined and available to the sender via a web server. The method relates to customizing a multi-media message created by a sender for a recipient, the multi-media message having an animated entity audibly presenting speech converted from text created by the sender. The method comprises receiving at least one image from the sender, associating each at least one image with a tag, presenting the sender with options to insert the tag associated with one of the at least one image into the sender text, and after the sender inserts the tag associated with one of the at least one images into the sender text, delivering the multi-media message with the at least one image presented as background to the animated entity according to a position of the tag associated with the at least one image in the sender text. In another embodiment of the invention, a template is provided to the sender to create multi-media messages using predefined static images or video clips. The method comprises providing the sender with a group of customizable multi-media message templates, each template of the groups of templates including predefined parameters comprising a predefined text message, a predefined animated entity, a predefined background, predefined background music, and a predefined set of emoticons within the text of the message. The sender is further provided with options to accessorize the animated entity with various additional features such as glasses and the like for more creative presentation of the multi-media message.

23 Claims, 11 Drawing Sheets

U.S. PATENT DOCUMENTS

| | | | |
|---|---|---|---|
| 5,555,426 A | 9/1996 | Johnson et al. | |
| 5,638,502 A | 6/1997 | Murata | |
| 5,640,590 A | 6/1997 | Luther | |
| 5,647,834 A | 7/1997 | Ron | |
| 5,657,426 A | 8/1997 | Waters et al. | |
| 5,689,618 A | 11/1997 | Gasper et al. | |
| 5,697,789 A | 12/1997 | Sameth et al. | |
| 5,732,232 A | 3/1998 | Brush et al. | |
| 5,745,360 A * | 4/1998 | Leone et al. | 715/513 |
| 5,781,186 A * | 7/1998 | Jennings | 715/500.1 |
| 5,818,461 A | 10/1998 | Rouet et al. | |
| 5,826,234 A | 10/1998 | Lyberg | |
| 5,857,099 A | 1/1999 | Mitchell et al. | |
| 5,860,064 A | 1/1999 | Henton | |
| 5,880,731 A | 3/1999 | Liles et al. | |
| 5,963,217 A | 10/1999 | Grayson et al. | |
| 5,982,853 A | 11/1999 | Liebermann | |
| 5,983,190 A | 11/1999 | Trower et al. | |
| 5,995,119 A | 11/1999 | Cosatto et al. | |
| 5,995,639 A | 11/1999 | Kado et al. | |
| 6,002,997 A | 12/1999 | Tou | |
| 6,011,537 A * | 1/2000 | Slotznick | 715/733 |
| 6,018,744 A | 1/2000 | Mamiya et al. | |
| 6,064,383 A * | 5/2000 | Skelly | 345/758 |
| 6,122,177 A | 9/2000 | Kitano et al. | |
| 6,122,606 A | 9/2000 | Johnson | |
| 6,147,692 A | 11/2000 | Shaw et al. | |
| 6,161,082 A | 12/2000 | Goldberg et al. | |
| 6,173,250 B1 | 1/2001 | Jong | |
| 6,195,631 B1 | 2/2001 | Alshawi et al. | |
| 6,219,638 B1 | 4/2001 | Padmanabhan et al. | |
| 6,230,111 B1 * | 5/2001 | Mizokawa | 702/182 |
| 6,232,966 B1 | 5/2001 | Kurlander | |
| 6,233,544 B1 | 5/2001 | Alshawi | |
| 6,243,681 B1 | 6/2001 | Guji et al. | |
| 6,289,085 B1 | 9/2001 | Miyashita et al. | |
| 6,377,925 B1 | 4/2002 | Greene et al. | |
| 6,381,346 B1 | 4/2002 | Eraslan | |
| 6,385,586 B1 | 5/2002 | Dietz | |
| 6,393,107 B1 | 5/2002 | Ball et al. | |
| 6,405,225 B1 | 6/2002 | Apfel et al. | |
| 6,453,294 B1 | 9/2002 | Dutta et al. | |
| 6,460,075 B1 | 10/2002 | Krueger et al. | |
| 6,466,213 B1 | 10/2002 | Bickmore et al. | |
| 6,476,815 B1 | 11/2002 | Ando | |
| 6,496,868 B1 | 12/2002 | Krueger et al. | |
| 6,522,333 B1 | 2/2003 | Hatlelid et al. | |
| 6,532,011 B1 | 3/2003 | Francini et al. | |
| 6,539,354 B1 | 3/2003 | Sutton et al. | |
| 6,542,936 B1 * | 4/2003 | Mayle et al. | 709/250 |
| 6,545,682 B1 | 4/2003 | Ventrella et al. | |
| 6,631,399 B1 | 10/2003 | Stanczak et al. | |
| 6,665,860 B1 | 12/2003 | DeSantis et al. | |
| 6,680,934 B1 | 1/2004 | Cain | |
| 6,692,359 B1 | 2/2004 | Williams et al. | |
| 6,784,901 B1 | 8/2004 | Harvey et al. | |
| 2001/0019330 A1 | 9/2001 | Bickmore et al. | |
| 2001/0049596 A1 | 12/2001 | Lavine et al. | |
| 2001/0050681 A1 * | 12/2001 | Keys et al. | 359/794 |
| 2001/0050689 A1 * | 12/2001 | Park | 33/722 |
| 2002/0007276 A1 * | 1/2002 | Rosenblatt et al. | 222/211 |
| 2002/0109680 A1 * | 8/2002 | Orbanes et al. | 99/608 |
| 2002/0194006 A1 | 12/2002 | Challapali | |
| 2003/0028378 A1 | 2/2003 | August et al. | |
| 2003/0035412 A1 | 2/2003 | Wang et al. | |
| 2003/0046160 A1 | 3/2003 | Paz-Pujalt et al. | |
| 2003/0191816 A1 * | 10/2003 | Landress et al. | 401/97 |
| 2004/0091154 A1 * | 5/2004 | Cote | 403/341 |

OTHER PUBLICATIONS

H. Noot, ZS. M. Rutkay, Chartoon 20.0 Manual, Jan. 31, 2000.

Ming Ouhyoung, I-Chen Lin, David S.D. Lee, "Web-Enabled Speech Driven Facial Animation", Proc. of ICAT'99 (International Conference on Artificial Reality and Tele-existence), pp. 23-28, Conference held on Dec. 16-18, 1999, Tokyo, Japan.

David Kurlander, Tim Skelly, David Salesin, "Comic Chat", Proceedings of the 23rd Annual Conference on Computer Graphics land Interactive Techniques, Aug. 1996, no day.

Pollack, "Happy in the East or Smiling in the West", New York Times. Aug. 12, 1996.

Pelachaud, et al. "Generating Facial Expressions for Speech", Cognitive Science, Jan. 3, 1996, vol. 20, No. 1, pp. 1-46.

Lijun Yin, A. Basu; "MPEG4 face modeling using fiducial points", IEEE; Image Processing, 1997, Proceedings., International Conference on, vol.: 1, 26-29, 1997, year only.

"Photo-realistic Talking-heads From Image Samples," by E. Cosatto and H. P. Graf, IEEE Transactions on Multimedia, Sep. 2000, vol. 2, issue 3, pp. 152-163, no completed dates.

"Audio-Visual Speech Modeling for Continuous Speech Recognition," IEEE Trans. on MultiMedia, vol. 2, No. 3, Sep. 2000, no completed dates.

TTS Based Very Low Bit Rate Speech Coder, by K-S. Lee and R. V. Cox, Proc. ICASSP 1999, vol. I, Mar. 1999, pp. 181-184, no complete dates.

"Emu: An E-mail Preprocessor for Text-to-Speech," by Richard Sproat, Jianying Hu, and Hao Chen, IEEE Signal Processing Society 1998 Workshop on Multimedia Signal Processing, Dec. 7-9, 1998, Los Angeles, CA., USA, no completed dates.

"Trends of ASR and TTS Applications in Japan," Proc. of International Workshop on Interactive Voice Technology for Telecommunications Applications (IVTTA96), Sep. 1996, no complete dates.

* cited by examiner

METHOD FOR SENDING MULTI-MEDIA MESSAGES USING CUSTOMIZABLE BACKGROUND IMAGES

PRIORITY APPLICATION

The present application claims priority to U.S. patent application Ser. No. 60/245,521 filed Nov. 3, 2000, the contents of which are incorporated herein.

RELATED APPLICATIONS

The present application is related to the following U.S. patent applications: Ser. No. 10/003,094 entitled "System and Method for Sending Multi-Media Message With Customized Audio"; Ser. No. 10/003,091 entitled "System and Method for Receiving Multi-Media Messages"; Ser. No. 10/003,350 entitled "System and Method for Sending Multi-Media Messages Using Emoticons"; Ser. No. 10/003,092 entitled "System and Method of Customizing Animated Entities for Use in a Multi-Media Communication Application"; Ser. No. 09/999,526 entitled "System and Method of Controlling Sound in a Multi-Media Communication Application"; Ser. No. 09/999,525 entitled "System and Method of Marketing Using a Multi-Media Communication System"; and Ser. No. 09/999,505 entitled "A System and Method of Providing Multi-Cultural Multi-Media Messages." These applications, filed concurrently herewith and commonly assigned, are incorporated herein by reference.

BACKGROUND OF THE INVENTION

1. Field of the Invention

The present invention relates to multi-media messages and more specifically to a system and method of customizing the creation and sending of multi-media messages.

2. Discussion of Related Art

There is a growing popularity for text-to-speech ("TTS") enabled systems that combine voice with a "talking head" or a computer-generated face that literally speaks to a person. Such systems improve user experience with a computer system by personalizing the exchange of information. Systems for converting text into speech are known in the art. For example, U.S. Pat. No. 6,173,263 B1 to Alistair Conkie, assigned to the assignee of the present invention, discloses a system and method of performing concatenative speech synthesis. The contents of this patent are incorporated herein by reference.

One example associated with the creation and delivery of e-mails using a TTS system is LifeFX™'s facemail™. FIG. 1 illustrates how a sender creates a message using the LifeFX™ system. A window 10 presents fields for inserting the sender's e-mail address 12 and the recipient's e-mail address 14. Standard features such as control buttons 16 for previewing and delivering the multi-media message are provided. A standard subject line is also provided 18. The sender chooses from a variety of faces 20 to deliver the message. The currently chosen face 22 appears in the window 10 as well. The sender inserts the message text as with a traditional e-mail in a text area 24 and a box 26 below the text area gives illustrations of some of the available emoticons, explained further below.

This system enables a sender to write an e-mail and choose a talking head or "face" to deliver the e-mail. The recipient of the e-mail needs to download special TTS software in order to enable the "face" to deliver the message. The downloaded software converts the typewritten e-mail from the e-mail sender into audible words, and synchronizes the head and mouth movements of the talking head to match the audibly spoken words. Various algorithms and software may be used to provide the TTS function as well as the synchronization of the speech with the talking head. For example, the article, "Photo-realistic Talking-heads From Image Samples," by E. Cosatto and H. P. Graf, *IEEE Transactions on Multimedia*, September 2000, Vol. 2, Issue 3, pages 152–163, describes a system for creating a realistic model of a head that can be animated and lip-synched from phonetic transcripts of text. The contents of this article are incorporated herein by reference. Such systems, when combined with TTS synthesizers, generate video animations of talking heads that resemble people. One drawback of related systems is that the synthesized voice bears no resemblance to the sender voice.

The LifeFX™ system presents the user with a plurality of faces 20 from which to choose. Once a face is chosen, the e-mail sender composes an e-mail message. Within the e-mail, the sender inserts features to increase the emotion showed by the computer-generated face when the e-mail is "read" to the e-mail recipient. For example, the following will result in the message being read with a smile at the end: "Hi, how are you today?:-)". These indicators of emotion are called "emoticons" and may include such features as: :-) (frown); -o (wow); :-x (kiss); and ;-) (wink). The e-mail sender will type in these symbols which are translated by the system into the emotions. Therefore, after composing a message, inserting emoticons, and choosing a face, the sender sends the message. The recipient will get an e-mail with a notification that he or she has received a facemail and that they will need to download a player to hear the message.

The LifeFX™ system presents its emoticons when delivering the message in a particular way. For example, when an emoticon such as a smile is inserted in the sentence "Hi, Jonathon, :-) how are you today?" the "talking head" 22 speaks the words "Hi, Jonathan" and then stops talking and begins the smiling operation. After finishing the smile, the talking head completes the sentence "how are you today?".

The LifeFX™ system only enables the recipient to hear the message after downloading the appropriate software. There are several disadvantages to delivering multi-media messages in this manner. Such software requires a large amount of disc space and the recipient may not desire to utilize his or her space with the necessary software. Further, with viruses prevalent on the Internet, many people are naturally reluctant to download software when they are unfamiliar with its source.

FIG. 2 illustrates a received facemail™ 40. The chosen talking head 22 delivers the message. Buttons such as "say again" 42, "new" 44, "forward" 26, "reply" 48, "reply all" 50, and "show text" 52 enable the recipient to control to some degree how the message is received. Buttons 42, 44, 46, 48 and 50 are commonly used button features for controlling messages. Button 52 allows the user to read the text of the message. When button 52 is clicked, the text of the message is shown in a window illustrated in FIG. 3. A separate window 54 pops up typically over the talking head 22 with the text. When the window is moved or does not cover the talking head, the sound continues but if the mouth of the talking head is showing, it is clear that when the text box is up, the mouth stops moving.

SUMMARY OF THE INVENTION

What is needed in the art is a system and method of enabling a sender to further customize his or her environment for a multi-media message. The prior art fails to provide options wherein a sender can choose background images or videos. Thus, if a sender wishes to e-mail a friend and explain about a trip to Europe, there is no option to include in the background of the e-mail pictures associated with the trip. The present invention addresses this deficiency in the prior art by providing further customization to the sender for the creation and sending of multi-media messages using an animated entity in the area of background images and video clips.

One embodiment of the invention relates to a method of customizing a multi-media message created by a sender for a recipient, the multi-media message having an animated entity audibly presenting speech converted from text created by the sender. The method comprises receiving at least one image from the sender, associating each at least one image with a tag, presenting the sender with options to insert the tag associated with one of the at least one image into the sender text, and after the sender inserts the tag associated with one of the at least one images into the sender text, delivering the multi-media message with the at least one image presented as background to the animated entity according to a position of the tag associated with the at least one image in the sender text.

A variation of this embodiment of the invention includes presenting the at least one image as background when a word prior to the position of the tag associated with the at least one image is presented by the animated entity. In this manner, the method comprises various options for when to begin or end displaying a sender image during the presentation of a multi-media message to the recipient. For example, if a particular image tag is included in the text, the beginning of the display of that image may be at the beginning of a paragraph, a predefined number of words before the tag, or a predefined period of time before the tag. Further options include the sender inserting a "start" tag before the sender image tag and a "stop" tag after the sender image tag within the text of the message. The image associated with the sender image tag may be either a static image, such as a still picture, or it may be a video clip of various lengths.

In another embodiment of the invention, a template is provided to the sender to create multi-media messages using predefined static images or video clips. This embodiment relates to a method of sending a multi-media message from a sender to a recipient, the multi-media message including an animated entity for delivering a message having text. The method comprises providing the sender with a group of customizable multi-media message templates, each template including predefined parameters comprising a predefined text message, a predefined animated entity, a predefined background, predefined background music, and a predefined set of emoticons within the text of the message. If the sender chooses a customizable multi-media message template, the method comprises presenting the sender with options to change any of the predefined parameters. Once the sender customizes the multi-media message template, if at all, the method further comprises delivering the multi-media message to the recipient.

A variation on the method comprises presenting the sender with options to change any of the predefined parameters by choosing from a list of predefined and/or sender-added options for each of the template parameters in order to customize the multi-media message. Yet another related option includes presenting the user with an option to choose at least one position from which the animated entity will deliver the message. In this manner, the sender has much more control over the multi-media message environment. When sender-created or predefined background images or videos are inserted, the sender has control of minimizing or moving the location of the animated entity such that the animated entity does not block the recipient's view of the background image or video.

Further enhancements include presenting the user with an option to control animated entity entrance and departure features. Such features include fade in or fade out, entrance from a top, right, left, or bottom position, and more. A variety of entrance and exit patterns are contemplated in this step. Other variations include presenting the user with an option to modify a camera position using camera control tags within the text. These tags enable the user to control a camera position and thus change the angular view of the recipient. This feature can be used to highlight or focus in on various features of the inserted images or video and provide variety during the multi-media message.

BRIEF DESCRIPTION OF THE DRAWINGS

The foregoing advantages of the present invention will be apparent from the following detailed description of several embodiments of the invention with reference to the corresponding accompanying drawings, in which.

DETAILED DESCRIPTION OF THE INVENTION

The present invention may be best understood with reference to the accompanying drawings and description herein. The basic system design supporting the various embodiments of the invention is first disclosed. A system comprises a TTS and an animation server to provide a multi-media message service over the Internet wherein a sender can create a multi-media message presentation delivered audibly by an animated entity.

Figure 1:
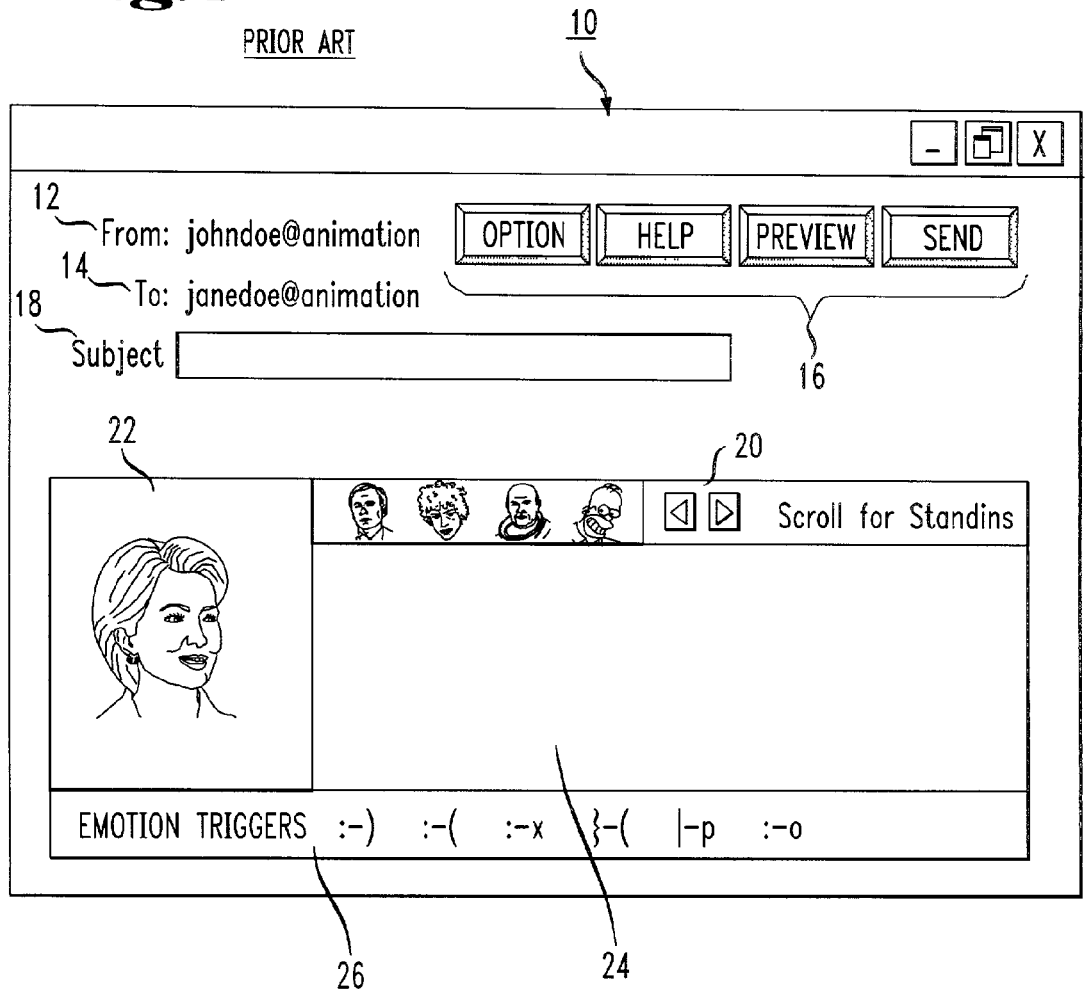
FIG. 1 illustrates a prior art window for creating a multi-media message.
Figure 2:
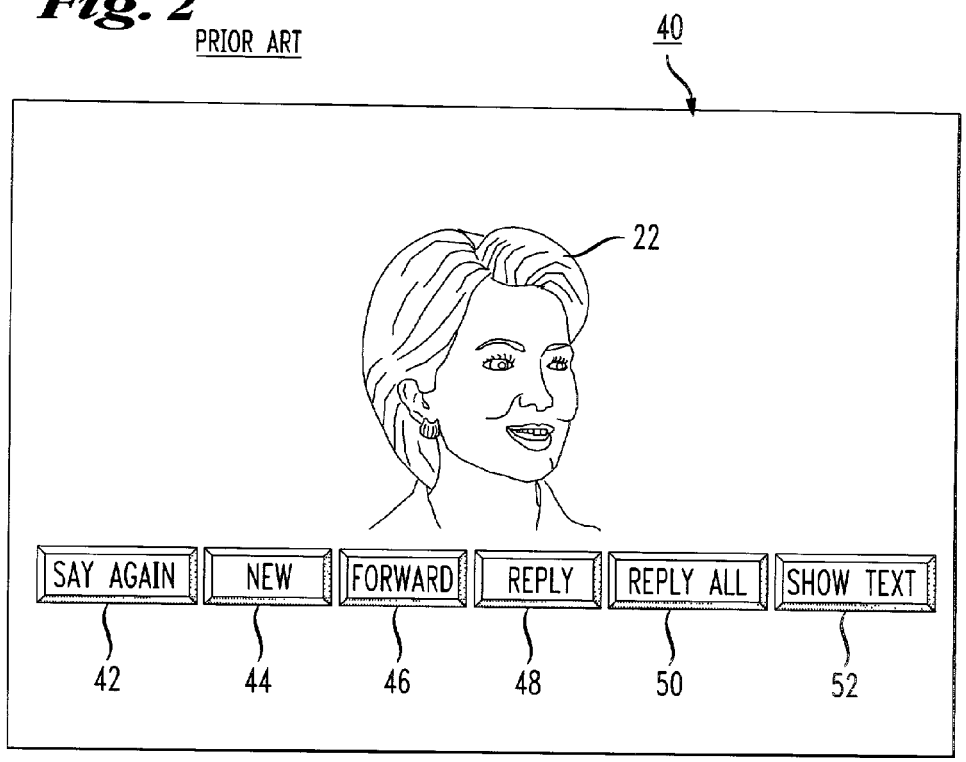
FIG. 2 illustrates a prior art window viewed by a recipient of a multi-media message.
Figure 3:
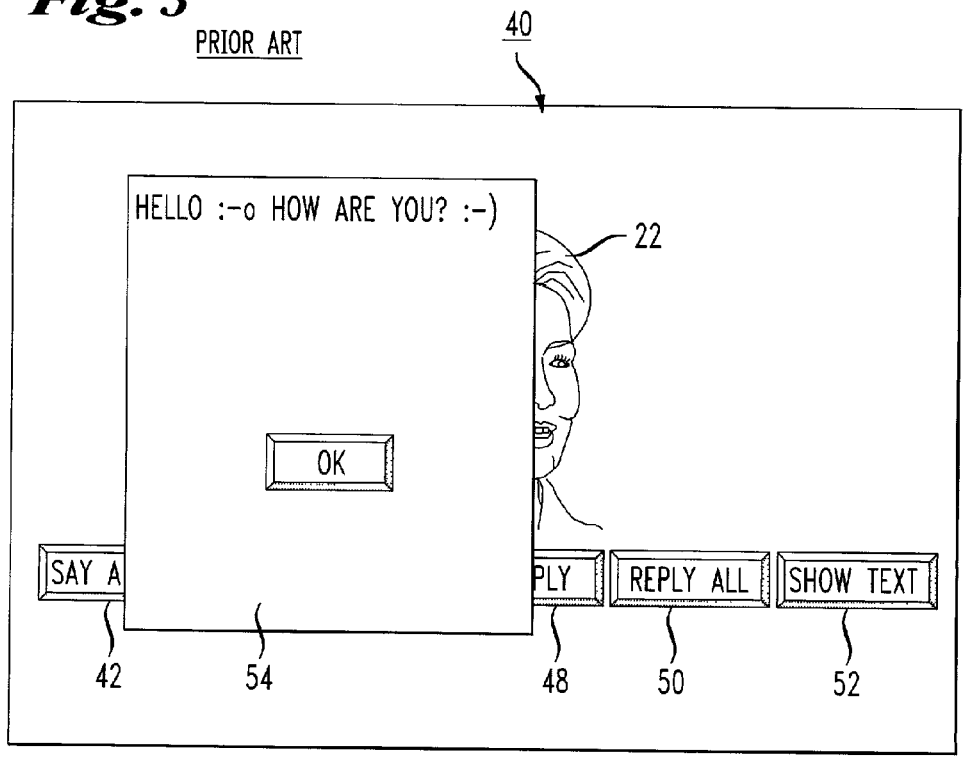
FIG. 3 illustrates a prior art window in response to a recipient of a multi-media message clicking on a "show text" button.
Figure 4A:
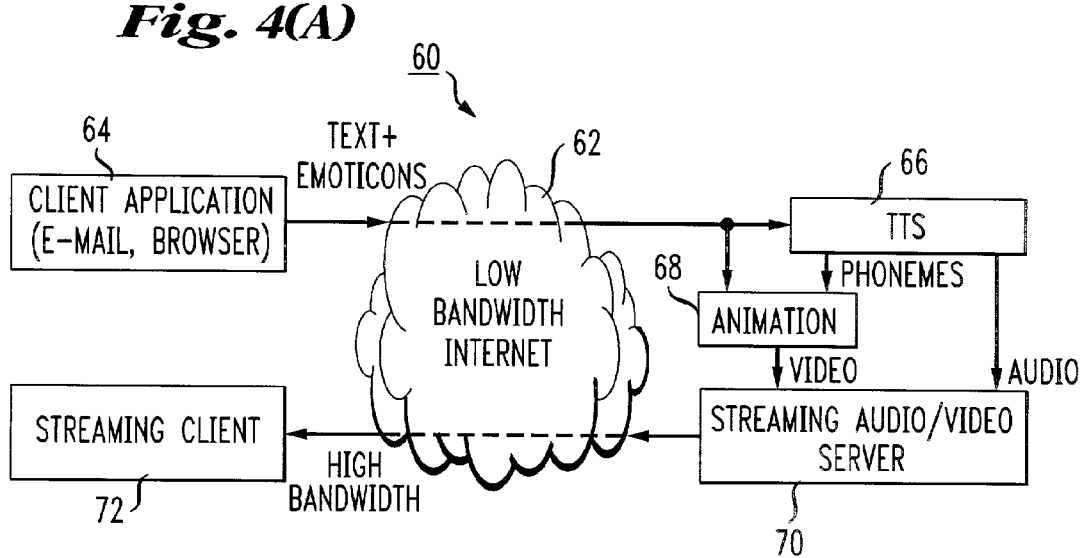
FIG. 4(a) illustrates the basic architecture of the system according to an embodiment of the present invention.

FIG. 4(a) illustrates a high-bandwidth architecture 60 associated with the embodiments of the invention. The system 60 delivers a hyper-text mark-up language (HTML) page through the Internet 62 (connected to a web server, not shown but embodied in the Internet 62) to a client application 64. The HTML page (shown by way of example in FIG. 6) enables the sender to create a multi-media message. The client application may be, for example, a web browser such as Microsoft's Internet Explorer®. Other client applications include e-mail and instant messaging clients. The sender creates the multi-media message using the HTML page.

The web server receives the composed multi-media message, which includes several components that are additional to a regular e-mail or instant message. For example, a multi-media message includes a designation of an animated entity for audibly delivering the message and emoticons that add emotional elements to the animated entity during the delivery of the message. The HTML page delivered to the client terminal enables the sender to manipulate various buttons and inputs to create the multi-media message.

Once the sender finishes creating the multi-media message and sends the message, the Internet 62 transmits the message text with emoticons and other chosen parameters to a text-to-speech (TTS) server 66 that communicates with an animation or face server 68 to compute and synchronize the multi-media message. The transmission of the text-to-speech data may be accomplished using such methods as those disclosed in U.S. Pat. No. 6,173,250 B1 to Kenneth Jong, assigned to the assignee of the present invention. The contents of this patent are incorporated herein by reference.

The animation server 68 receives phonemes associated with the sender message and interpreted by the TTS server 66, including the text of the subject line and other text such as the name of the sender, as well as other defined parameters or data. The animation server 68 processes the received phonemes, message text, emoticons and any other provided parameters such as background images or audio and creates an animated message that matches the audio and the emoticons. An exemplary method for producing the animated entity is disclosed in U.S. Pat. No. 5,995,119 to Cosatto et al. ("Cosatto et al."). The Cosatto et al. patent is assigned to the assignee of the present invention and its contents are incorporated herein by reference. Cosatto et al. disclose a system and method of generating animated characters that can "speak" or "talk" received text messages. Another reference for information on generating animated sequences of animated entities is found in U.S. Pat. No. 6,122,177 to Cosatto et al. ("Cosatto et al. II"). The contents of Cosatto et al. II are incorporated herein by reference as well.

The system 60 encodes the audio and video portions of the multi-media message for streaming through a streaming audio/video server 70. In a high-bandwidth version of the present invention, as shown in FIG. 4(a), the server 70 streams the multi-media message to the streaming client 72 over the Internet 62. One of ordinary skill in the art will understand and be cognizant of a variety of TTS servers and TTS technologies that may be optimally used for converting the text to speech. The particular implementation of TTS technologies is not relevant to the present invention. One of ordinary skill in the art will understand and be cognizant of a variety of animation servers and animation technologies that may be optimally used for converting phonemes and emoticons into talking entities, preferably faces. The particular implementation of animation technologies is not relevant to the present invention.

Figure 4B:
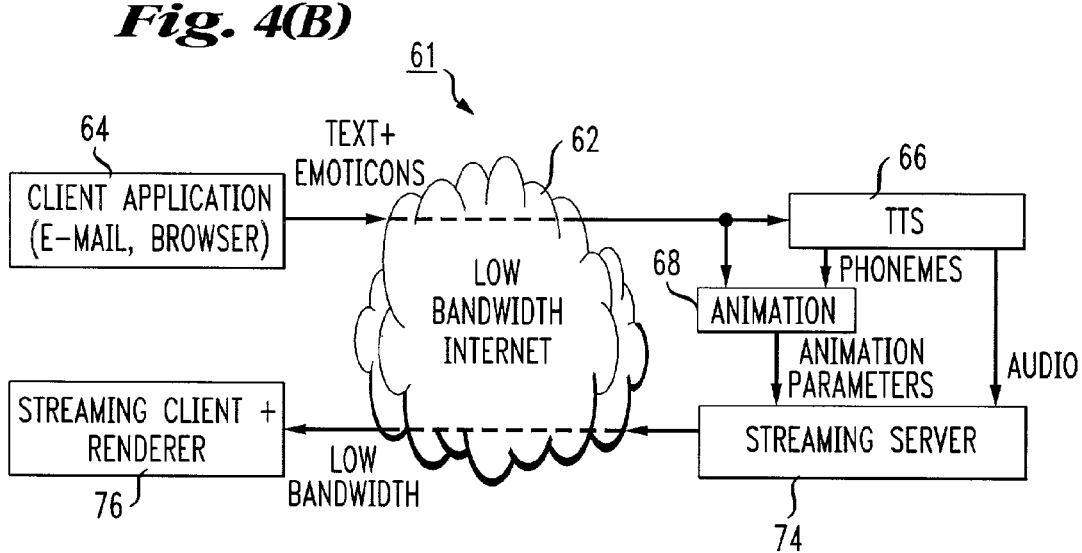
FIG. 4(b) illustrates a low bandwidth version of the system shown in FIG. 4(a)

FIG. 4(b) illustrates a low-bandwidth system 61 of the present invention. In this variation, the animation server 68 produces animation parameters that are synchronized with the audio produced from the TTS server 66. The audio and animation parameters are encoded and transmitted by the streaming server 74 over a lower bandwidth connection over the Internet 62. The streaming client 76 in this aspect of the invention differs from the streaming client 72 of FIG. 4(a) in that client 76 includes rendering software for rendering the animation on the client device using the streamed animation parameters provided from the streaming server 74. Furthermore, the client includes a TTS synthesizer that synthesizes the audio. In this manner, the systems disclosed in FIGS. 4(a) and 4(b) provide both a high-bandwidth and a low-bandwidth option for all users.

A further variation of the invention applies when the client device includes the animation or rendering software. In this case, the client device 72, 76 can receive a multi-media message e-mail, with the message declared as a specific multipurpose Internet mail extension (MIME) type, and render the animation locally without requiring access to a central server or streaming server 70, 74. In one aspect of the invention, the rendering software includes a TTS synthesizer with the usable voices. In this case, the recipient device 72, 76 receives the text (very little data) and the face model (several kb), unless it is already stored in a cache at the receiver device 72, 76. If the receiver device 72, 76 is requested to synthesize a voice different from the ones available at its TTS synthesizer, the server 74 downloads the new voice.

High quality voices typically require several megabytes of disk space. Therefore, if the voice is stored on a streaming server 74, in order to avoid the delay of the huge download, the server 74 uses a TTS synthesizer to create the audio. Then, the server 74 streams the audio and related markup information such as phonemes, stress, word-boundaries, bookmarks with emoticons, and related timestamps to the recipient. The recipient device 76 locally renders the face model using the face model and the markup information and synchronously plays the audio streamed from the server.

Figure 5:
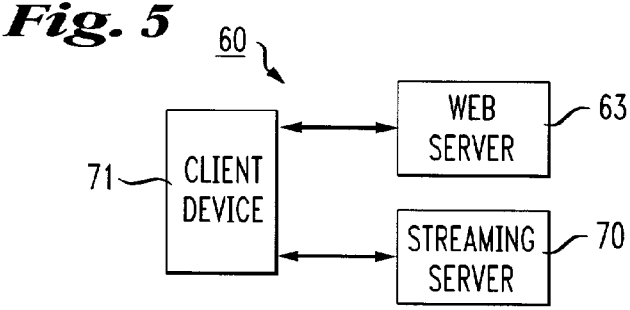
FIG. 5 shows example architecture for delivering the multi-media message.

When the recipient receives an e-mail message associated with the multi-media message, the message is received on a client device 71 such as that shown in FIG. 5. FIG. 5 illustrates a different view of system 60. The client device may be any one of a desktop, laptop computer, a wireless device such as a cell phone, 3Com's palmpilot® or personal data assistant and the like. The particular arrangement of the client device 71 is unimportant to the present invention. The multi-media message may be delivered over the Internet, via a wireless communication system such as a cellular communication system or via a satellite communication system.

The multi-media message delivery mechanism is also not limited to an e-mail system. For example, other popular forms of communication include instant messaging, bulletin boards, I Seek You (ICQ) and other messaging services. Instant messaging and the like differ from regular e-mail in that its primary focus is immediate end-user delivery. In this sense, the sender and recipient essentially become interchangeable because the messages are communicated back and forth in real time. Presence information for a user with an open session to a well-known multi-user system enables friends and colleagues to instantly communicate messages back and forth. Those of skill in the art know various architectures for simple instant messaging and presence awareness/notification. Since the particular embodiment of the instant message, bulletin board, or I Seek You (ICQ) or other messaging service is not relevant to the general principles of the present invention, no further details are provided here. Those of skill in the art will understand and be able to apply the principles disclosed herein to the particular communication application. Although the best mode and preferred embodiment of the invention relates to the e-mail context, the multi-media messages may be created and delivered via any messaging context.

For instant messaging, client sessions are established using a multicast group (more than 2 participants) or unicast (2 participants). As part of the session description, each participant specifies the animated entity representing him. Each participant loads the animated entity of the other participants. When a participant sends a message as described for the e-mail application, this message is sent to a central server that animates the entity for the other participants to view or streams appropriate parameters (audio/animation parameters or audio/video or text/animation parameters or just text) to the participants that their client software uses to render the animated entity.

Further as shown in FIG. 5, when a client device 71 receives a request from the recipient to view a multi-media message, the client device 71 sends a hypertext transfer protocol (HTTP) message to the web server 63. As a response, the web server sends a message with an appropriate MIME type pointing to the server 70 at which point the server 70 streams the multi-media message to the client terminal for viewing and listening. This operation is well known to those of skill in the art.

In an alternate aspect of the invention, the client device 71 stores previously downloaded specific rendering software for delivering multi-media messages. As discussed above, LifeFX™ requires the recipient to download its client software before the recipient may view the message. Therefore, some of the functionality of the present invention is applied in the context of the client terminal 71 containing the necessary software for delivering the multi-media message. In this case, the animation server 68 and TTS server 66 create and synchronize the multi-media message for delivery. The multi-media message is then transmitted, preferably via e-mail, to the recipient. When the recipient opens the e-mail, an animated entity shown in the message delivery window delivers the message. The local client software runs to locally deliver the message using the animated entity.

Many web-based applications require client devices to download software on their machines, such as with the LifeFX™ system. As mentioned above, problems exist with this requirement since customers in general are reluctant and rightfully suspicious about downloading software over the Internet because of the well-known security problems such as virus contamination, trojan horses, zombies, etc. New software installations often cause problems with the existing software or hardware on the client device. Further, many users do not have the expertise to run the installation process if it gets even slightly complicated e.g., asking about system properties, directories, etc. Further, downloading and installing software takes time. These negative considerations may prevent hesitant users from downloading the software and using the service.

Some Java-based applications are proposed as a solution for the above-mentioned problems but these are more restrictive due to security precautions and can't be used to implement all applications and there is no unified Java implementation. Therefore, users need to configure their browsers to allow Java-based program execution. As with the problems discussed above, a time-consuming download of the Java executable for each use by users who do not know if they really need or like to use the new application may prevent users from bothering with the Java-based software.

Accordingly, an aspect of the present invention includes using streaming video to demonstrate the use of a new software application. Enabling the user to preview the use of a new software application solves the above-mentioned these problems for many applications. Currently, almost all client machines have a streaming video client such as Microsoft's Mediaplayer® or Real Player®. If not, such applications can be downloaded and configured with confidence. Note that the user needs to do this only once. These streaming video receivers can be used to receive and playback video on the client's machine.

According to this aspect of the present invention, shown by way of example in FIG. 5, a user may wish to preview a multi-media message before downloading rendering software on the client device 71. If such is the case, the user enters into a dialogue with the streaming server 70 and requests a preview or demonstration of the capabilities of the application if the rendering software were downloaded. The streaming server 70 transmits to the client device 71 a multi-media message showing dynamic screen shots of the application as if it is running on the user's machine. As an example, if the new application would have the capability to show a three-dimensional view of a room based on vector graphics, the streaming video displays the three-dimensional output of the application on the user's monitor as video. Most existing players allow the users to control the video playback by clicking on buttons or the like on an HTML page. This provides an interactive feeling for the user if needed without loading any new or suspicious software.

Therefore, an aspect of the present invention enables the user, before downloading rendering software for presenting multi-media messages using an animated entity, to request a preview of the multi-media message streamed to the client as a video and presented on a player such as the Microsoft's Mediaplayer® or Real Player®. If the user so desires, he or she can then download the rendering software for enjoying the reception of multi-media messages.

Figure 6A:
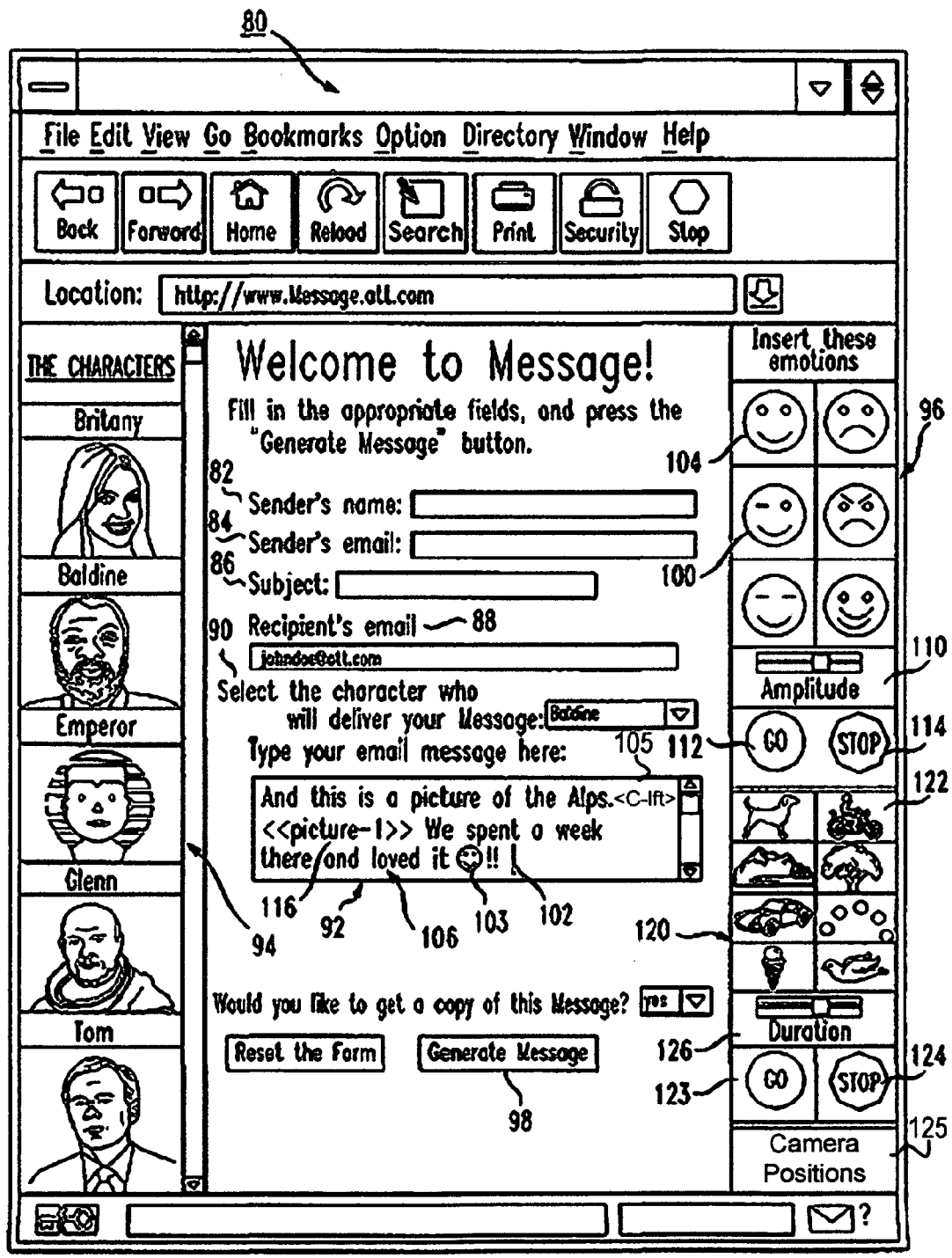
FIG. 6A shows an example of a dialogue page available to the sender for choosing images for insertion into the text message.

FIG. 6A shows an example of a template for the sender to use to create a multi-media message. A message-creation window 80 includes basic e-mail-related features such as fields for inserting a sender name 82 and sender e-mail address 84. A subject line 86 and recipient address field 88 are also provided. The sender enters the text of the message within a standard text field 92. Various animated entities 94 are available from which the sender may choose one (90) for delivering the message. Typically the animated entities are faces as shown in FIG. 6A, but they may be any entity such as an animal, car, tree, robot, or anything that may be animated.

The sender may also insert emoticons 103 into the text of the message. The system includes predefined emoticons 96, such as ":-)" for a smile, "::-)" for a head nod, "*w*" for an eye wink, and so forth. The predefined emoticons are represented either as icons or as text, such as ";-)". As shown in FIG. 6A, the window 80 includes a sample group of emoticon icons 96. The sender inserts an emoticon into a text message at the location of the cursor 102 by clicking on one of the emoticon icons 100. Alternately, shortcut keys such as <ALT-S> for a smile may be used. The sender may also type in the desired emoticon as text. Emoticon icons 96 save the sender from needing to type three keys, such as ":" and "-" and ")" for a smile. The icons 96 may be either a picture of, say, a winking eye or a icon representation of the characters ";-)" 100, or other information indicating to the sender that clicking on that emoticon icon will insert the associated emotion 103 into the text at the location of the cursor 102.

Once the sender composes the text of the message, chooses an animated entity 94, and inserts the desired emoticons 103, he or she generates the multi-media message by clicking on the generate message button 98. The animation server 68 creates an animated video of the selected animated entity 94 for audibly delivering the message. The TTS server 66 converts the text to speech as mentioned above. Emoticons 103 in the message are translated into their corresponding facial expressions such as smiles and nods. The position of an emoticon 103 in the text determines when the facial expression is executed during delivery of the message.

Execution of a particular expression preferably occurs before the specific location of the emoticon in the text. This is in contrast to the LifeFX™ system, discussed above, in which the execution of the smile emoticon in the text "Hello, Jonathan :-) how are you?" starts and ends between the words "Jonathan" and "how". In the present invention, the expression of the emoticon begins a predefined number of words or a predefined time before the emoticon's location in the text. Furthermore, the end of the expressions of an emoticon may be a predefined number of words after the location of the emoticon in the text or a predetermined amount of time after the location of the emoticon.

For example, according to an aspect of the present invention, the smile in the sentence "Hello, Jonathan :-) how are you?" will begin after the word "Hello" and continue through the word "how" or even through the entire sentence. The animated entity in this case will be smiling while delivering most of the message—which is more natural for the recipient than having the animated entity pause while executing an expression.

Furthermore, the starting and stopping points for executing expressions will vary depending on the expression. For example, a wink typically takes a very short amount of time to perform whereas a smile may last longer. Therefore, the starting and stopping points for a wink may be defined in terms of 0.1 seconds before its location in the text to 0.5 seconds after the location of the wink emoticon in the text. In contrast, the smile emoticon's starting, stopping, and duration parameters may be defined in terms of the words surrounding the emoticons.

The group of emoticons available for choosing can include a wink, smile, frown, affirmative animated entity motion, such as a nod of the head, eyes opening and staring, eyes popping out, and nose elongation. All varieties of facial expressions and emotions are contemplated as part of the present disclosure and the particular set of emoticons is unimportant to this invention.

FIG. 6A further illustrates an amplitude bar 110. The sender manipulates this bar to increase or decrease the amplitude of the expression associated with a particular emoticon. For example, the sender may highlight a smile emoticon 106 by clicking on the smile emoticon 104. While the inserted emoticon is highlighted in the text message in the window 92, the sender manipulates the amplitude bar 110 to increase or decrease the amplitude of the emoticon expression.

As the sender increases or decreases the amplitude of the inserted emoticon, the expression shown in the smile icon 103 may reflect the modified amplitude. For example, with a text emoticon in the message text (not shown), a smile that is increased in amplitude by the amplitude bar 110 becomes ":-)))". Similarly, an icon emoticon 104 may reflect an increased amplitude in its appearance. The increased intensity of the emoticon may be accomplished by changing the icon from a black on white background to black on colored background (such as red or yellow) where the intensity of the background color reflects the amplitude. The amplitude of an emoticon may also be changed by other means such as by clicking the right mouse button, or its equivalent, to increase the amplitude or by clicking on the left mouse button, or its equivalent, to decrease the amplitude. In this regard, the sender can control the intensity of the emotion expressed by the animated entity to the recipient.

Further as shown in FIG. 6A, go button 112 and stop button 114 are also available to indicate start and stop locations for emoticons. A user may insert an emoticon into the text and then indicate using the go button 112 and stop button 114 when the effect of the emoticons should begin and end, respectively. In this regard, the amplitude bar 110 and go button 112 and stop button 114 provide the sender with additional control over the use of emoticons in multi-media messages.

For example, the emoticon can change its color or be shown several different times in order to indicate large amplitude. There may be a non-linear relationship between the number of icons and the amplitude. A first icon shown will set the base amplitude and each additional icon increases the amplitude by 50% or some other percentage of the base amplitude.

FIG. 6A further illustrates an image and/or video template 120 presented to the sender for inserting images as background into the multi-media message. Various images are illustrated, such as a motorcycle and rider 122, for selection by the sender. Preferably, if the sender clicks on an image, a small icon (image tag) such as a miniature picture of the image or text such as "<<picture-1>>" 116 or "<<video-1>> is inserted into the text of the message at the location of the curser 102. In this manner, the multi-media message will contain background images to enhance the presentation of the message. A go button 123 and a stop button 124 are selectable by the sender to indicate a starting and stopping point for presentation of the background image or video. As discussed above relative to the starting and stopping buttons 112, 114 for emoticons, the sender may use an image or video starting button 123 and stopping button 124 to insert starting and stopping icons related to the image/video tag. For example, the sender may insert a start icon at the beginning of the message in window 92 before the words "And this . . . . " The sender may then insert a stop icon at the location of the cursor 102. The start and stop icons may be any symbol indicative of their function. The duration of the inserted image/video <<picture-1>> will then begin with the words "And this . . . " and end with the words "loved it!" and, in one aspect, through the presentation of the smile emoticon 103.

The web server 62 or other server controlling the sender interaction with the web page 80 may also enter into a dialogue with the sender regarding duration of chosen background images/videos. For example, the sender may insert an image tag 116 and the server may request the sender to highlight the text associated with the image. In this case, for example, the sender highlights the text in text box 92 such that the system displays <<picture-1≦≦ while presenting the paragraph about the Alps. Such a dialogue is a preferred method to prevent the message text from becoming too complex with start and stop icons associated with emoticons and image tags.

Other means are also contemplated for indicating duration of images. For example, a "duration" bar 126 is selectable by the sender for choosing to start the presentation of the chosen image X number of seconds/minutes before the inserted image tag 116 and Y number or seconds/minutes after the inserted position of the image tag 116. When the web server 62 renders the animated entity, it will render that onto a background image according to the selected duration for the image tag.

The available images in the menu 120 may be personal images submitted by the sender or any digital image. These images or videos may be locally stored on the sender computer device or may be stored on the web server 62 or other remote location. Although no delineation is shown in FIG. 6A, a separate but similar menu structure may be presented to the sender with predefined pictures or videos. In this manner, the sender may have available numerous choices between personal pictures or videos and images or videos for sale or rent. For example, a service may be provided for a fee to use a certain number of videos or pictures per month for sending multi-media messages. Thus, as the sender creates the multi-media message, a variety of emoticons and images are available to increase the variety and interest of the multi-media message for the recipient.

Figure 6B:
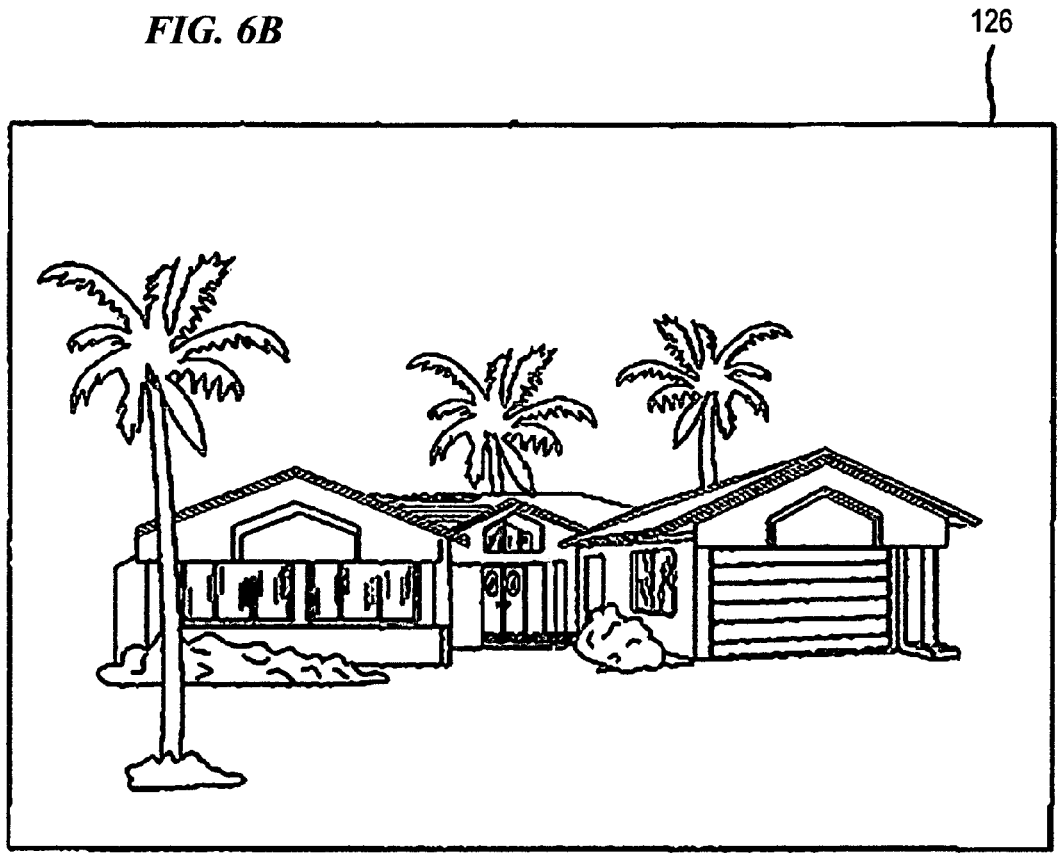
FIG. 6B illustrates an example of an option for adjusting a camera position.

FIG. 6A further a camera positions button 125 that the sender may select to change a camera position of an image. When the sender selects camera positions button 125, a dialog, such as illustrated by FIG. 6B may be displayed to the sender. FIG. 6B illustrates an image 126, which the sender may have selected as a background. The dialog of FIG. 6B may permit the sender to choose any of camera position buttons 127 to change a camera position, such that a view of the background image may change accordingly. A camera tag may be inserted into the text message as shown by camera tag 105 of FIG. 6A. In this example, camera tag 105 illustrates that the sender chose to move the camera position to the left, although any of the camera positions may have been chosen such as, for example, zoom, pull pack, move up, left, down, and right, as well as others (not shown).

When a background image becomes part of the multi-media message, the animated entity may block the view of the image. To accommodate the best visual experience when the background images are included, the present invention includes enabling the sender to move or remove the animated entity.

Figure 7:
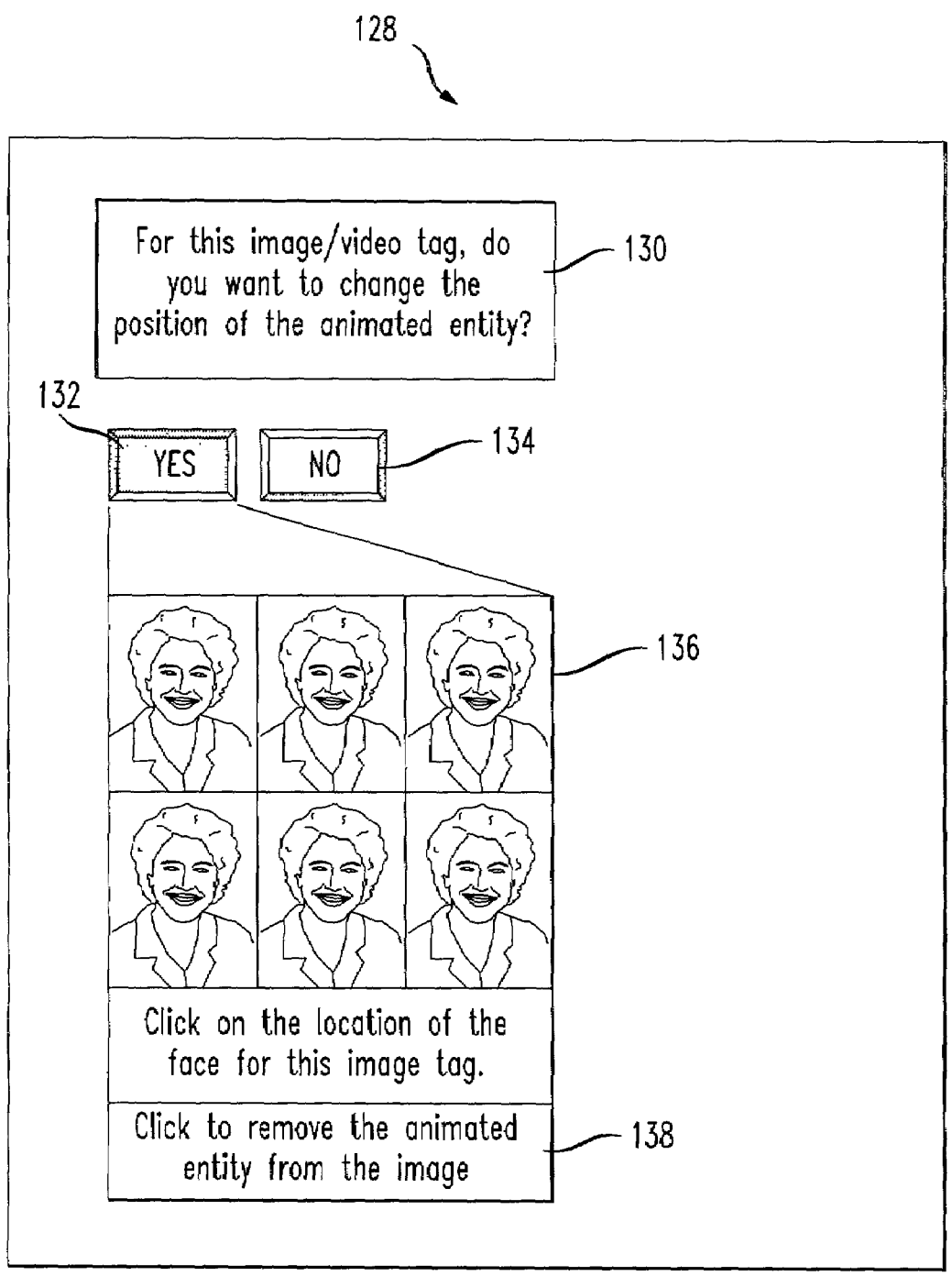
FIG. 7 illustrates an example of a dialogue with the sender for changing a position of the animated entity during the display of an image or video.

FIG. 7 illustrates an example dialogue with a sender from the interactive window 128 wherein if an image or video tag is inserted into the text of the message by the sender, the system presents an option to the sender to change the size and position of the animated entity during the presentation of the image or video associated with the inserted tag. The system presents an option 130 to the sender asking whether the sender wishes to change the position of the animated entity for the inserted tag. If the user selects the "no" button 134, then the animated entity remains in its predefined position, preferably in the center of the delivery window to the recipient. If the sender selects "yes" 132, a server presents a window 136 to the sender and instructs the sender to choose a position. The window 136 is provided for example only. In the example six positions are shown an preferably the image associated with the inserted tag is shown in the background to assist the sender in choosing an animated entity position. The sender clicks on one of the pictures to indicate where the animated entity should be positioned when "talking" during the presentation of the image associated with the inserted image tag. If the sender desires that the animated entity disappear during the presentation of this image, then an option 138 is available to click on to remove the video portion of the animated entity, thus leaving just the audio during the presentation of that image.

Other dialogues are contemplated such as to ask the sender regarding the size of the animated entity or asking the sender to simply click on a position within the image to locate the animated entity. Thus, the important aspect of the invention is the general option provided to the sender to control the position of the animated entity during the presentation of a particular image or video, and not the specific implementation of how that control is offered.

Figure 8:
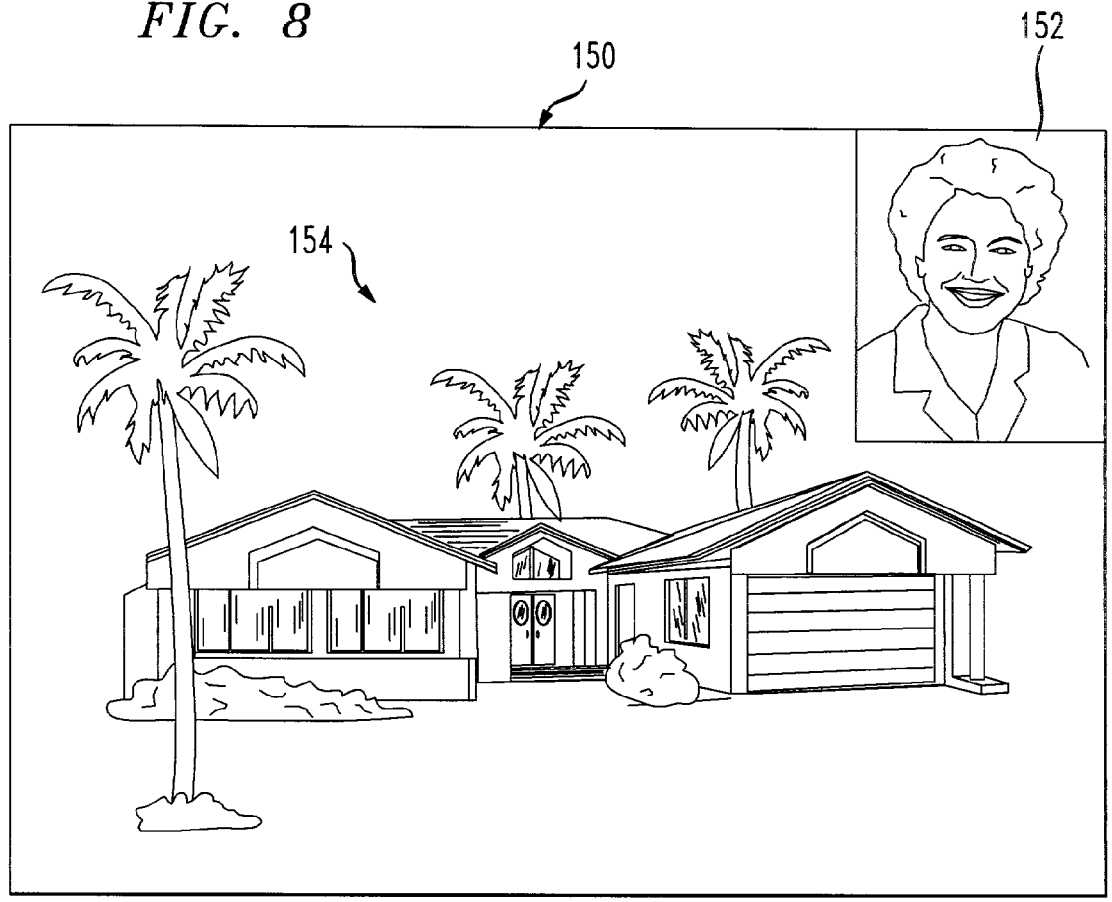
FIG. 8 illustrates a window with the animated entity in a selected position.

FIG. 8 illustrated a delivery window 150 viewed by the recipient of the multi-media message. In the window, the sender ahs inserted an image tag to show an image of a house and trees 154. The sender has also chosen to move the position of the animated entity 152 to the top right hand corner of the image so as to be out of the way of the main features of the image. The animated entity 152 continues to speak and present the message form this position.

Figure 9:
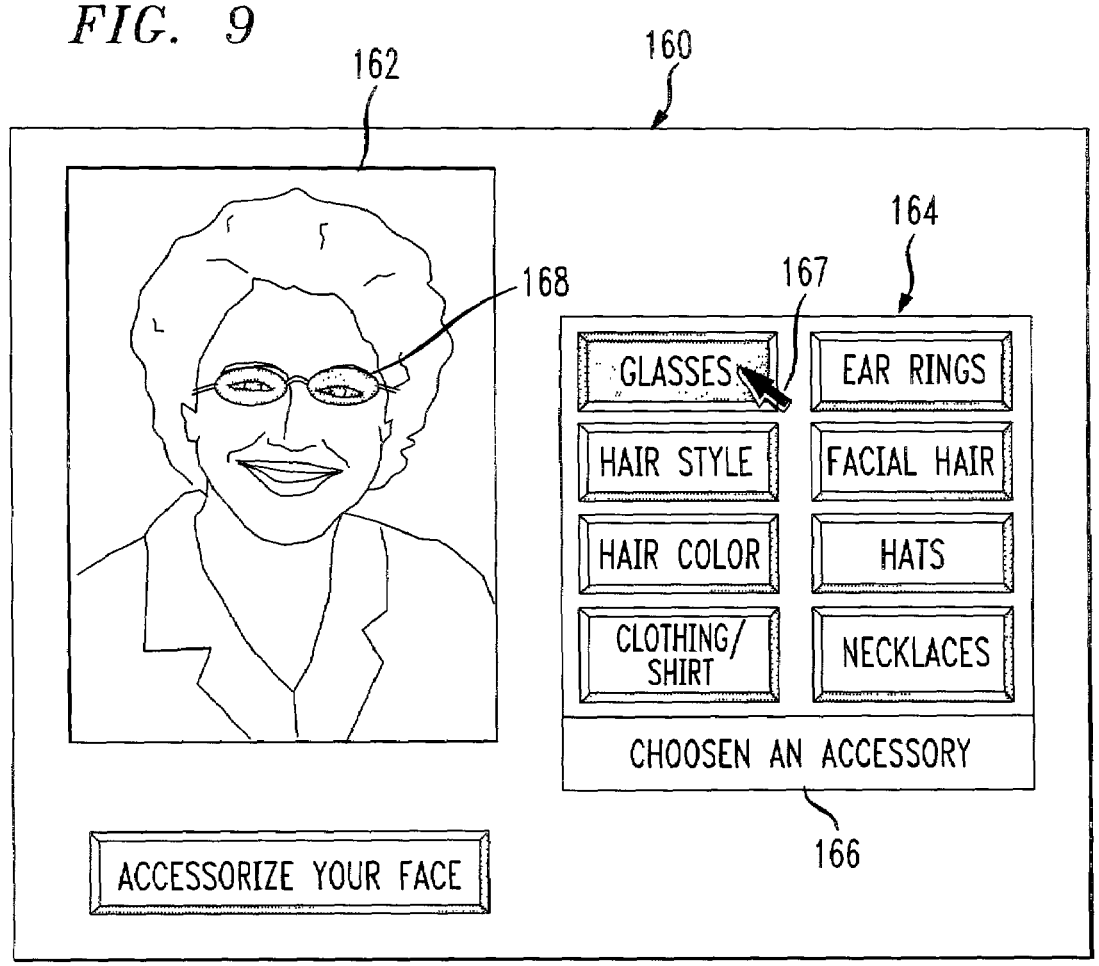
FIG. 9 illustrates an example template to enable the sender to accessorize the chosen animated entity before the multi-media message is delivered to the recipient.

Another variation of the present invention relates to the options provided to the sender to accessorize the animated entity. In this regard, the sender may choose an animated entity but wish to change or modify its appearance. For example, the sender may want to add a particular pair of sunglasses to the animated entity for a certain humorous effect. FIG. 9 illustrates a template 160 showing the chosen animated entity 162. The sender receives this template if he or she chooses to accessorize from a button (not shown) available on the multi-media message creation window 100 in FIG. 6.

As shown in FIG. 9, a listing of accessorizes is shown 164 with instructions to the sender 166 to choose an accessory. Preferably, as the sender clicks, say, on the "glasses" option 167, a drop-down menu, or other type of menu (not shown), will provide a series of images of glasses, both sunglasses and regular glasses. From this drop-down menu the sender may chose a pair of glasses 168 that will automatically appear on the animated entity 162 for preview. Similarly, when the sender chooses "Hair Style" or any of the other options, further menus will present the available options for choosing. In this manner, the sender may add whatever options he or she wished to further customize the presentation of the multi-media message. This general structure of the accessory window 160 may of course be modified in a variety of ways to present the sender with accessory options for the animated entity according to the present invention.

Figure 10:
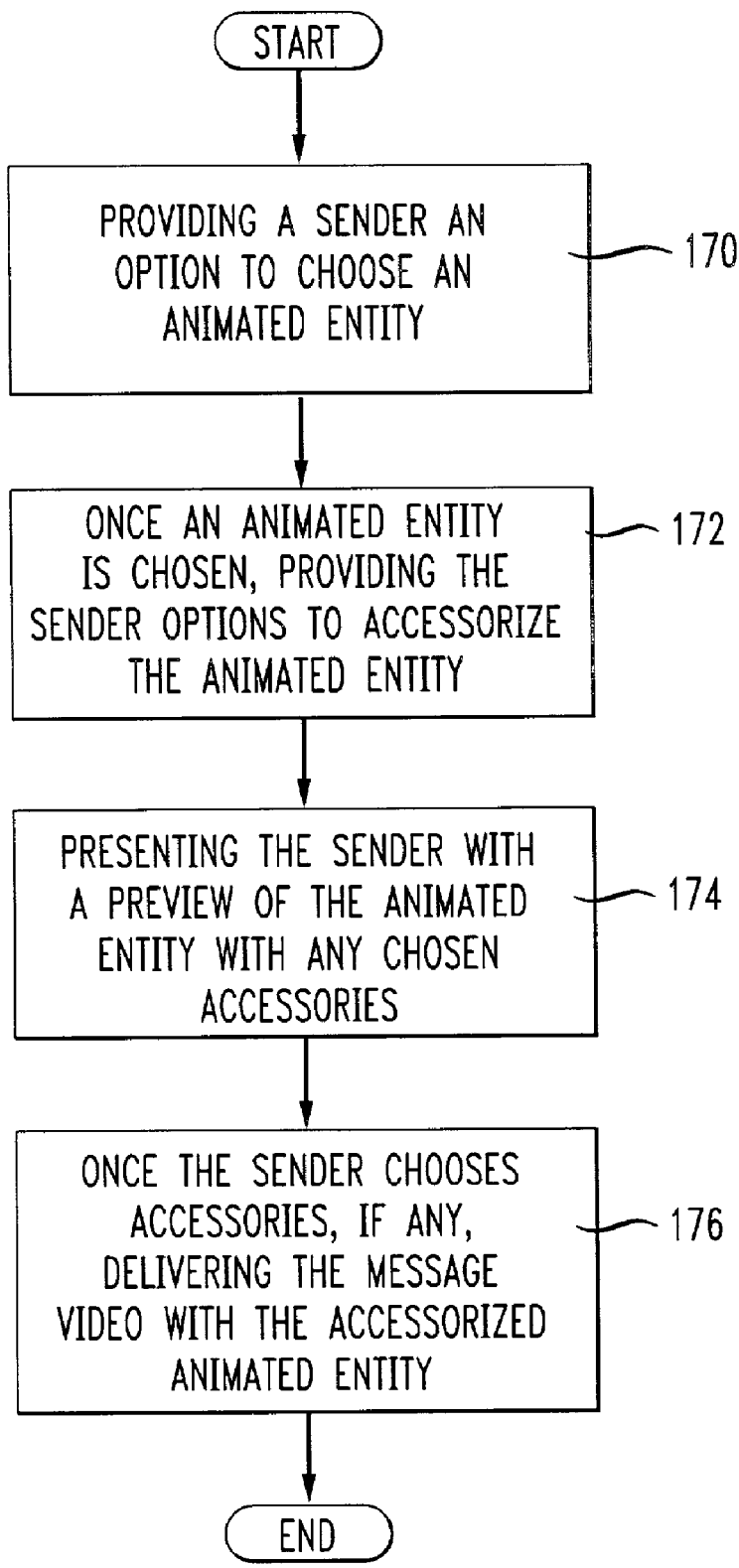
FIG. 10 illustrates an exemplary method for enabling a sender to choose and accessorize an animated entity.

FIG. 10 illustrates an exemplary method of enabling a sender to accessorize a chosen animated entity. The method relates to sending a multi-media message from a sender to a recipient, the multi-media message including an animated entity for delivering a message having text. In broad terms, the method comprises providing the sender with options to choose an animated entity from a group of animated entities (170). Once the sender chooses an animated entity to deliver the massage, the sender is presented with options to add accessories to the animated entity (172). The sender may be presented with a preview of the animated entity with the chosen accessories before the multi-media message is delivered (174). The preview enables the sender to see whether the chosen accessories are acceptable. Once the sender chooses accessories to add to the animated entity, if any, the method comprises delivering the multi-media message to the recipient (176).

As shown in FIG. 9, a listing of accessories is shown 164 with instructions to the sender 166 to choose an accessory. Preferably, as the sender clicks, say, on the "glasses" option 167, a drop-down menu, or other type of menu (not shown), will provide a series of images of glasses, both sunglasses and regular glasses. From this drop-down menu, the sender may choose a pair of glasses 168 that will automatically appear on the animated entity 162 for preview. Similarly, when the sender chooses "Hair Style" or any of the other options, further menus will present the available options for choosing. In this manner, the sender may add whatever options he or she wishes to further customize the presentation of the multi-media message. This general structure of the accessory window 160 may of course be modified in a variety of ways to present the sender with accessory options for the animated entity according to the present invention.

The list of accessories may include accessories from a multi-media message service provider or may be compiled by the sender. In this manner, advertisers may be able to subsidize the use of the server by promoting products via an accessory list. For example, a certain manufacturer of sunglasses may offer the latest brand of sunglasses as an accessory item within this context and pay royalties on a per use basis.

Figure 11:
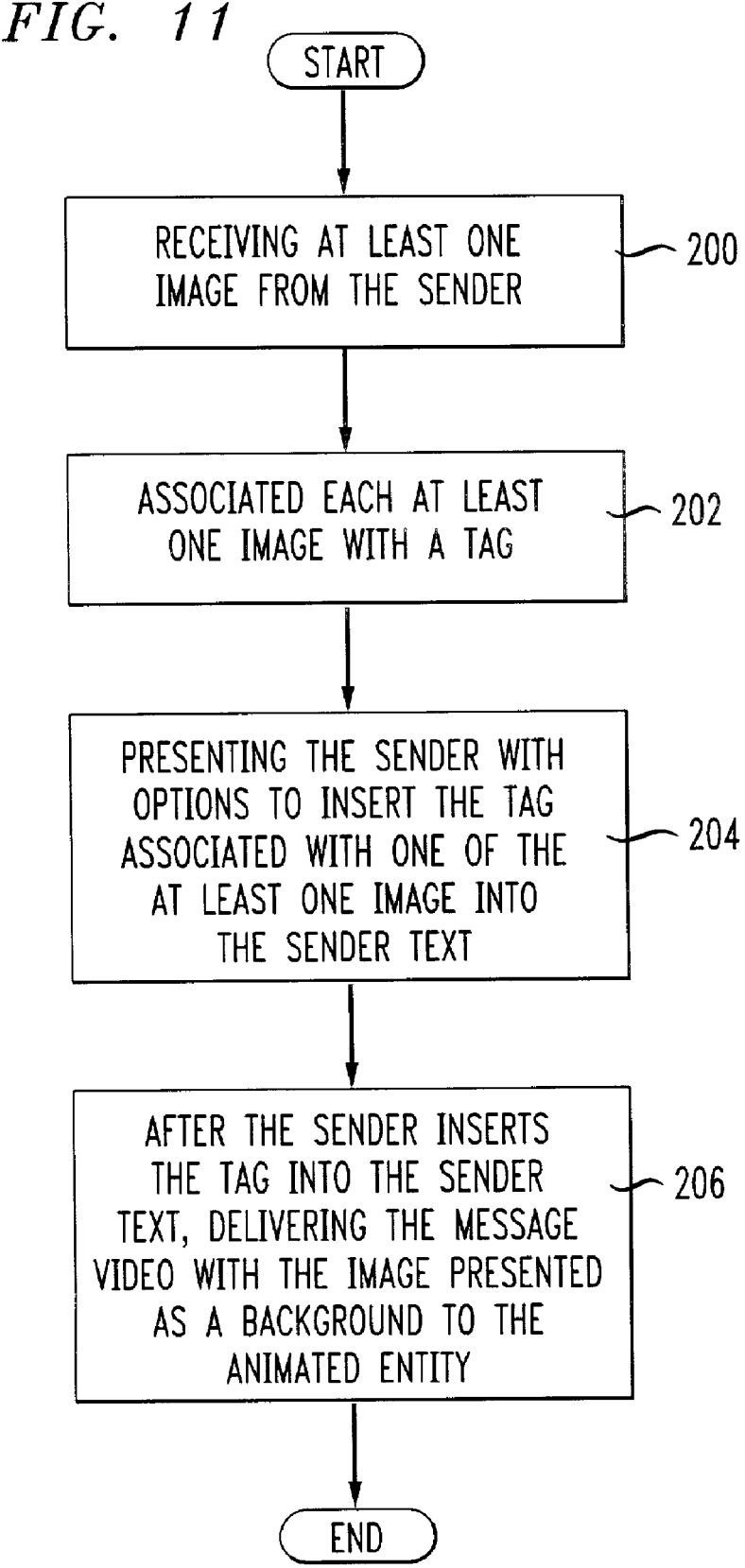
FIG. 11 illustrates an exemplary method for providing background images in a multi-media message.

FIG. 11 illustrates a method of customizing a multi-media message created by a sender for a recipient, the multi-media message having an animated entity audibly presenting speech converted from text created by the sender. The method comprises receiving at least one image from the sender (200), associating each at least one image with a tag (202), presenting the sender with options to insert the tag associated with one of the at least one images into the sender text (204) and after the sender inserts the tag associated with one of the at least one images into the sender text, delivering the multi-media message with the at least one image presented as background to the animated entity (206). Preferably, the image is presented during delivery of the multi-media message according to a position of the tag associated with the at least one image in the sender text.

There are variations in the method on the timing of when to first present the image associated with the inserted tag and when to stop presenting the image associated with the tag. The method further comprises presenting the at least one image as background when a word prior to the position of the tag associated with the at least one image is presented by the animated entity. The images associated with the inserted tags may be either static images or video clips received from the sender or predefined and available from the web server 62.

Thus, the sender may use both sender-created images or videos and predefined images or videos throughout the text of the message to be delivered in the multi-media message. As the multi-media message plays, all of the various images and videos are presented as background for the multi-media message. In one aspect of the invention, the predefined images or sender-created images are displayed as background to the animated entity beginning a predetermined number of words prior to the position of the respective tag within the sender text. Other various aspects are discussed above where the background images or videos are shown for a duration chosen by the sender via highlighting a block of text in the message which is then associated with an image or video. The face server 68 and TTS server 66 coordinate the starting and stopping points of the highlighted text and that information is associated with the presentation of a certain image or video.

Figure 12:
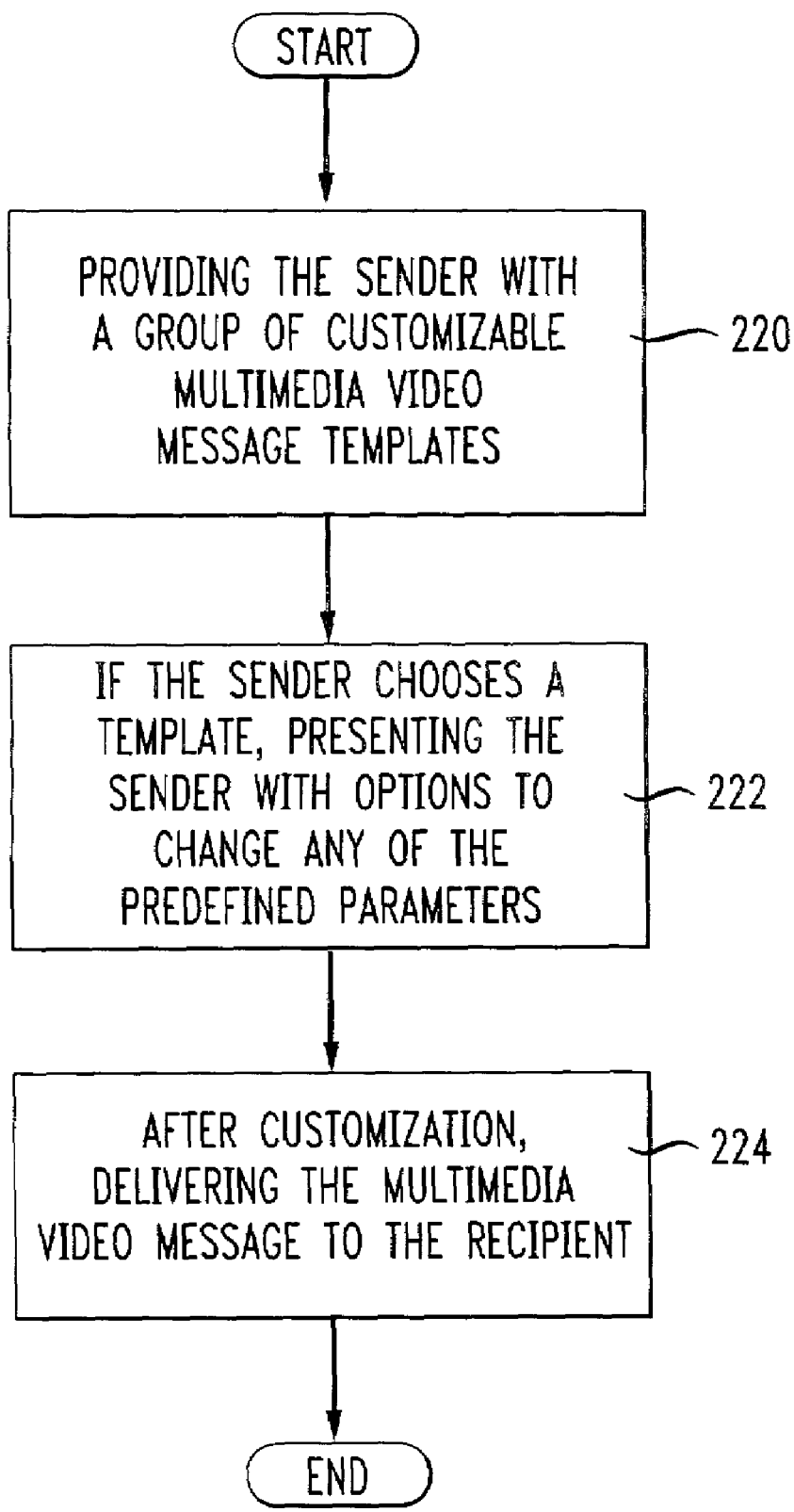
FIG. 12 illustrates an exemplary method for enabling a sender to use multimedia templates for creating multimedia messages.

FIG. 12 shows another aspect of the present invention. In this aspect of the invention, the method relates to a template used for creating an sending a multi-media message from a sender to a recipient, the multi-media message including an animated entity for delivering a message having text. The method comprises providing the sender with a group of customizable multi-media message templates (220), each template of the groups of templates including predefined parameters comprising a predefined text message, a predefined animated entity, a predefined background, predefined background music, and a predefined set of emoticons within the text of the message. If the sender chooses a customizable multi-media message template, the sender is presented with options to change any of the predefined parameters (222). The such as sound, volume, video clips, still background images, animated entity delivering the message, variations in voice, accent, and language. This list is not meant to be exhaustive as other features may be included.

Such templates enable the sender to easily work with a predefined animated entity, background images and even background music. For example, such a template would be advantageous if a sender wants to send an amorous message to a loved one. A template may be created much like an electronic greeting card that already includes an appropriate background, animated entity, and soft music. From the template, the sender can modify any of the parameters and then provide the sender text for the message. This provides a quick way to create an appropriate multi-media message for any occasion.

Once the sender customizes the multi-media message template, if at all, the method further comprises delivering the multi-media message to the recipient (224).

Among the options available to the sender by way of customization of a template is to add the name of the recipient to a predefined template or to choose from a list of predefined and/or sender-added options for each of the template parameters for customizing the multi-media message. Further options include, as discussed above relative to background images and the position of the animated entity during the presentation of a particular background image, presenting the user with an option to choose at least one position from which the animated entity will deliver the message. The sender may also be provided with the option associated with a predefined template to control the animated entity entrance and departure features and to modify the camera position using camera control tags within the text.

Further options available to the sender in creating the multi-media message relate to control of camera position. Such options enable the sender to modify such camera positions as zoom, pull back, move up, right, left or down, etc. If the sender chooses to modify the camera position, a dialogue between the system and the sender will enable the sender to modify the camera position on all or a portion of the multi-media message. Camera position tags may be inserted into the text of the message or other means may be provided for modifying the camera position for a portion of the presentation. In this manner, for example, if the background picture was a family portrait with twenty family members, the animated entity could give biographical information for each person, and rather then identifying the "third person from the left on the front row . . . "the sender can control the camera position such that the camera zooms in on the person currently being discussed.

Although the above description may contain specific details, they should not be construed as limiting the claims in anyway. Other configurations of the described embodiments of the invention are part of the scope of this invention. For example, the present disclosure is presented in the context of delivering e-mails. However, the present invention may be applied in any communication context where an animated entity can deliver a message created from text. For example, instant messaging technology may include an option to type a message and have the message delivered by an animated face. Therefore, the present invention may be applied in a variety of contexts. The appended claims and their legal equivalents should only define the invention, rather than any specific examples given.

We claim:

1. A method of customizing a multi-media message created by a sender for a recipient, the multi-media message having an animated entity audibly presenting speech converted from text created by the sender, the method comprising:

receiving at least one image from the sender;
associating each of the at least one image with a tag;
presenting the sender with options to insert the tag associated with one of the at least one image into the sender text; and
after the sender inserts the tag associated with the one of the at least one image into the sender text, delivering the multi-media message with the one of the at least one image presented as background to the animated entity according to a position of the tag associated with the one of the at least one image in the sender text, wherein
delivering the multi-media message further comprises presenting the one of the at least one image as background when a word prior to the position of the tag associated with the one of the at least one image is presented by the animated entity.

2. The method of claim 1, wherein delivering the multi-media message further comprises presenting the one of the at least one image as background when a word a predetermined number of word positions prior to the position of the tag associated with the one of the at least one image is presented by the animated entity.

3. The method of customizing a multi-media message created by a sender for a recipient of claim 1, wherein the at least one image is a static image.

4. The method of customizing a multi-media message created by a sender for a recipient of claim 1, wherein the at least one image is a video.

5. A method of customizing a multi-media message created by a sender for a recipient, the multi-media message having an animated entity audibly presenting speech converted from text created by the sender, the method using stored predefined images having associated image tags and stored sender-created images having associated sender-created tags, the method comprising:

presenting the sender with options to insert image tags and sender-created tags into the sender text; and
after the sender inserts the image tags or sender-created tags, delivering the multi-media message with the predefined images or sender-created images associated with the inserted image tags and/or sender-created tags presented as background to the animated entity according to a position of the respective tag within the sender text, wherein
the predefined images or sender-created images are displayed as background to the animated entity as soon as a predetermined number of words prior to the position of the respective tag within the sender text begins to be delivered.

6. The method of customizing a multi-media message created by a sender for a recipient of claim 5, wherein the predefined images or sender-created images are no longer displayed as background to the animated entity as soon as a predetermined number of words after the position of the respective tag within the sender text begins to be delivered.

7. The method of customizing a multi-media message created by a sender for a recipient of claim 5, wherein the predefined images are either static images or video images.

8. The method of customizing a multi-media message created by a sender for a recipient of claim 7, wherein the sender-created images are either static images or video images.

9. A method of customizing a multi-media message created by a sender for a recipient the multi-media message having an animated entity audibly presenting speech converted from text created by the sender, the method using a stored image having an associated visible image tag, the method comprising:

presenting the sender with an option to insert the visible image tag into the sender text, such that when the visible image tag is inserted, the visible image tag, the sender text, and a position of the visible image tag with respect to the sender text is displayed;
presenting the sender with an option to position the animated entity in any location on a display screen using an animated entity position tag;
after the sender inserts the visible image tag and the animated entity position tag, delivering the multi-media message with the image associated with the inserted visible image tag presented as background to the animated entity according to a position of the respective tag within the sender text and wherein the position of the animated entity during the delivery of the multi-media message is associated with the animated entity position tag;
presenting the sender with an option to remove the animated entity from the display screen using an animated entity remove tag; and
if the sender inserts the animated entity remove tag, delivering the multi-media message with the image associated with the inserted image tag presented as background while removing the animated entity according to a position of the animated entity remove tag within the sender text.

10. The method of customizing a multi-media message created by a sender for a recipient of claim 9, wherein the stored image is a static or a video image.

11. A method of sending a multi-media message from a sender to a recipient, the multi-media message including an animated entity for delivering a message having text, the method comprising:

providing the sender with a group of customizable multi-media message templates, each template of the groups of templates including predefined parameters comprising a predefined text message, a predefined animated entity, a predefined background, predefined background music, and a predefined set of emoticons within the text of the message; and
if the sender chooses a customizable multi-media message template, presenting the sender with options to change any of the predefined parameters; and
presenting the sender with an option to modify a camera position using camera control tags within the text, the option to modify the camera position including one of move up, move down, move left, or move right.

12. The method of sending a multi-media message from a sender to a recipient of claim 11, wherein once the sender customizes the multi-media message template, if at all, the method further comprises delivering the multi-media message to the recipient.

13. The method of claim 11, wherein presenting the sender with options to change any of the predefined parameters further comprises presenting the sender with an option to add a name of the recipient to the multi-media message.

14. The method of claim 11, wherein presenting the sender with options to change any of the predefined parameters further comprises presenting the sender with an option to choose from a list of predefined and/or sender-added options for each of the template parameters for customizing the multi-media message.

15. The method of claim 11, wherein presenting the sender with options to change any of the predefined parameters further comprises presenting the sender with an option to choose at least one position from which the animated entity will deliver the message.

16. The method of claim 11, further comprising:
providing the sender with an option to choose an animated entity from a group of animated entities.

17. The method of sending a multi-media message from a sender to a recipient of claim 12, wherein delivering the multi-media message further comprises presenting the background when a word prior to a position of a tag associated with an image of the background is presented by the animated entity.

18. The method of sending a multi-media message from a sender to a recipient of claim 15, wherein presenting the user with an option to choose at least one position from which the animated entity will deliver the message further comprises presenting the sender with an option to control animated entity entrance and departure features.

19. The method of claim 16, further comprising:
presenting the sender with an option to add an accessory comprising one of glasses, ear rings, a hat, a shirt, hair color, hair style, or facial hair to the animated entity.

20. The method of claim 19, wherein presenting the sender with an option to add an accessory to the animated entity further comprises presenting the sender with a list of accessories, the list of accessories including accessories provided by a multi-media message service provider and accessories added by the sender.

21. The method of claim 19, wherein upon the sender choosing the option to add an accessory, presenting the sender with a preview of the animated entity with the added accessory.

22. A method of sending a multi-media message from a sender to a recipient, the multi-media message including an animated entity for delivering a message having text, the method comprising:
providing the sender with options to choose an animated entity from a group of animated entities;
providing the sender with options to insert emoticons in the text of the message;
providing the sender with options to modify an amplitude of emoticons inserted in the text of the message; and
once the sender chooses emoticons to add to the animated entity, if any, delivering the multi-media message to the recipient, wherein
if the sender modifies the amplitude of emoticons inserted in the text, changing a color associated with the modified emoticons.

23. The method of sending a multi-media message of claim 22, wherein the respective color of the modified emoticons relates to an intensity of the respective modified amplitude.

* * * * *